(12) United States Patent
Tennessen et al.

(10) Patent No.: US 8,647,763 B2
(45) Date of Patent: Feb. 11, 2014

(54) BATTERY COOLANT JACKET

(75) Inventors: Peter Thomas Tennessen, San Francisco, CA (US); Jeffrey C. Weintraub, San Carlos, CA (US); Weston Arthur Hermann, Palo Alto, CA (US)

(73) Assignee: Tesla Motors, Inc., Palo Alto, CA (US)

(*) Notice: Subject to any disclaimer, the term of this patent is extended or adjusted under 35 U.S.C. 154(b) by 259 days.

(21) Appl. No.: 13/173,096

(22) Filed: Jun. 30, 2011

(65) Prior Publication Data
US 2013/0004820 A1 Jan. 3, 2013

(51) Int. Cl.
*H01M 10/00* (2006.01)

(52) U.S. Cl.
USPC .............................. 429/120; 429/62

(58) Field of Classification Search
USPC .............................. 429/120, 62, 433, 437, 438
See application file for complete search history.

(56) References Cited

U.S. PATENT DOCUMENTS

| 5,501,918 A * | 3/1996 | Gruenstern et al. ......... 429/120 |
| 2011/0293986 A1 * | 12/2011 | Kozu ............................ 429/120 |

* cited by examiner

*Primary Examiner* — Mark F Huff
*Assistant Examiner* — Monique Willis
(74) *Attorney, Agent, or Firm* — J. Richard Soderberg (57) ABSTRACT

A battery coolant jacket for use with a plurality of cells is provided, the jacket comprised of a hollow enclosure configured to permit a liquid coolant to flow through the enclosure, entering via a coolant inlet and exiting via a coolant outlet; a plurality of cell apertures that extend completely through the hollow enclosure, where each cell aperture is sized to fit a cell; and a plurality of coolant segregation walls that are integrated into the hollow enclosure and separate the cells into groups of cells, and where each coolant segregation wall forms a barrier between the cell group contained within that coolant segregation wall and the liquid coolant flowing through the hollow enclosure. The coolant jacket may include at least one flow control wall integrated within the hollow enclosure that controls the coolant flow pathway between the enclosure's coolant inlet and outlet, for example causing the coolant flow pathway to alternate directions between adjacent cell groups.

18 Claims, 10 Drawing Sheets

BATTERY COOLANT JACKET

FIELD OF THE INVENTION

The present invention relates generally to battery cooling systems and, more particularly, to a means for improving the manufacturability and performance of a battery cooling system.

BACKGROUND OF THE INVENTION

There is currently a trend in the automotive industry to replace combustion engines with electric motors or a combination of an electric motor and a combustion engine, thereby substantially reducing the environmental impact of automobiles by reducing (i.e., hybrids) or completely eliminating (i.e., electric vehicles) car emissions. This switch in drive train technology is not, however, without its technological hurdles as the use of an electric motor translates to the need for inexpensive batteries with high energy densities, long operating lifetimes, and operable in a wide range of conditions. Additionally, it is imperative that the battery pack of a vehicle pose no undue health threats, either during vehicle use or during periods of storage.

While current rechargeable battery technology is able to meet the demands of the automotive industry, the relatively unstable nature of the chemistries used in such batteries often leads to specialized handling and operating requirements. For example, rechargeable batteries such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures. In the case of a battery pack used in an electric vehicle, a severe car crash may simultaneously send multiple cells within the battery pack into thermal runaway.

During a thermal runaway event, a large amount of thermal energy is rapidly released, heating the entire cell up to a temperature of 850° C. or more. Due to the increased temperature of the cell undergoing thermal runaway, the temperature of adjacent cells within the battery pack will also increase. If the temperature of these adjacent cells is allowed to increase unimpeded, they may also enter into a state of thermal runaway, leading to a cascading effect where the initiation of thermal runaway within a single cell propagates throughout the entire battery pack. As a result, power from the battery pack is interrupted and the system employing the battery pack is more likely to incur extensive collateral damage due to the scale of thermal runaway and the associated release of thermal energy.

There are a number of approaches that may be taken to reduce the risk of thermal runaway. For example, to prevent batteries from being shorted out during storage and/or handling, precautions can be taken such as insulating the battery terminals and using specifically designed battery storage containers. Another approach is to develop new cell chemistries and/or modify existing cell chemistries. Yet another approach is to provide additional shielding at the cell level, thus inhibiting the flow of thermal energy from the cell undergoing thermal runaway to adjacent cells.

Active battery cooling is another approach that is typically used to reduce the risk of thermal runaway risk as well as optimize battery performance and lifetime. Some active battery cooling systems blow air across the batteries themselves, or across a radiator that is thermally coupled to the batteries. Alternately, a battery cooling system may use cooling tubes and a liquid coolant flowing within the cooling tubes to withdraw heat from the batteries.

While a number of techniques have been used, either alone or in combination, to maintain the temperature of the cells within a battery pack to within a reasonable temperature range, these techniques are often overly complex, resulting in a difficult to manufacture and costly battery pack. Accordingly, what is needed is a means for improving the manufacturability of a battery pack that uses a battery cooling system, and in particular, for improving the cost, mass, performance and ease of production for such a battery pack. The present invention provides such a means.

SUMMARY OF THE INVENTION

A battery coolant jacket for use with a plurality of cells is provided, the jacket comprised of a hollow enclosure configured to permit a liquid coolant to flow through the enclosure, entering via a coolant inlet and exiting via a coolant outlet; a plurality of cell apertures that extend completely through the hollow enclosure, where each cell aperture is sized to fit a cell; and a plurality of coolant segregation walls that are integrated into the hollow enclosure and separate the cells into groups of cells, and where each coolant segregation wall forms a barrier between the cell group contained within that coolant segregation wall and the liquid coolant flowing through the hollow enclosure. The hollow enclosure may be comprised of first and second jacket members, for example complementary members, where the cell apertures extend from an exterior surface corresponding to the first jacket member to an exterior surface corresponding to the second jacket member, and where the coolant segregation walls extend from an interior surface of the first jacket member to an interior surface of the second jacket member. The cell apertures may be sized to provide for an interference fit between each cell aperture and a corresponding cell; alternately, a thermally conductive material may be interposed, for example by wrapping or injection, between each cell aperture and a corresponding cell. Each cell group may be comprised of two adjacent rows of cells. The cells within each cell group may be completely segregated, or only partially segregated, from other cells of the same cell group by a cell segregation wall(s). The enclosure may include at least one flow control wall integrated within the hollow enclosure that controls the coolant flow pathway between the enclosure's coolant inlet and outlet. The enclosure may include at least one flow control wall integrated within the hollow enclosure that causes the coolant flow pathway to alternate directions between adjacent cell groups. The hollow enclosure may be formed from a plastic, thermoplastic (such as ABS), nylon, polypropylene, polyethylene, or other material. The battery coolant jacket may include one or more temperature sensors located within the hollow enclosure, for example located adjacent to the coolant inlet and outlet and/or located within the coolant flow pathways. The battery coolant jacket may be coupled to a vehicle battery cooling system via the enclosure's coolant inlet and outlet. The battery coolant jacket may be mounted within a battery pack.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium-ion (e.g., lithium iron phosphate, lithium cobalt oxide, other lithium metal oxides, etc.), lithium-ion polymer, nickel metal hydride, nickel cadmium, nickel hydrogen, nickel zinc, silver zinc, metal air or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all electric vehicle, also referred to as an EV, plug-in hybrid vehicles, also referred to as a PHEV, or a hybrid vehicle (HEV), a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Figure 1:
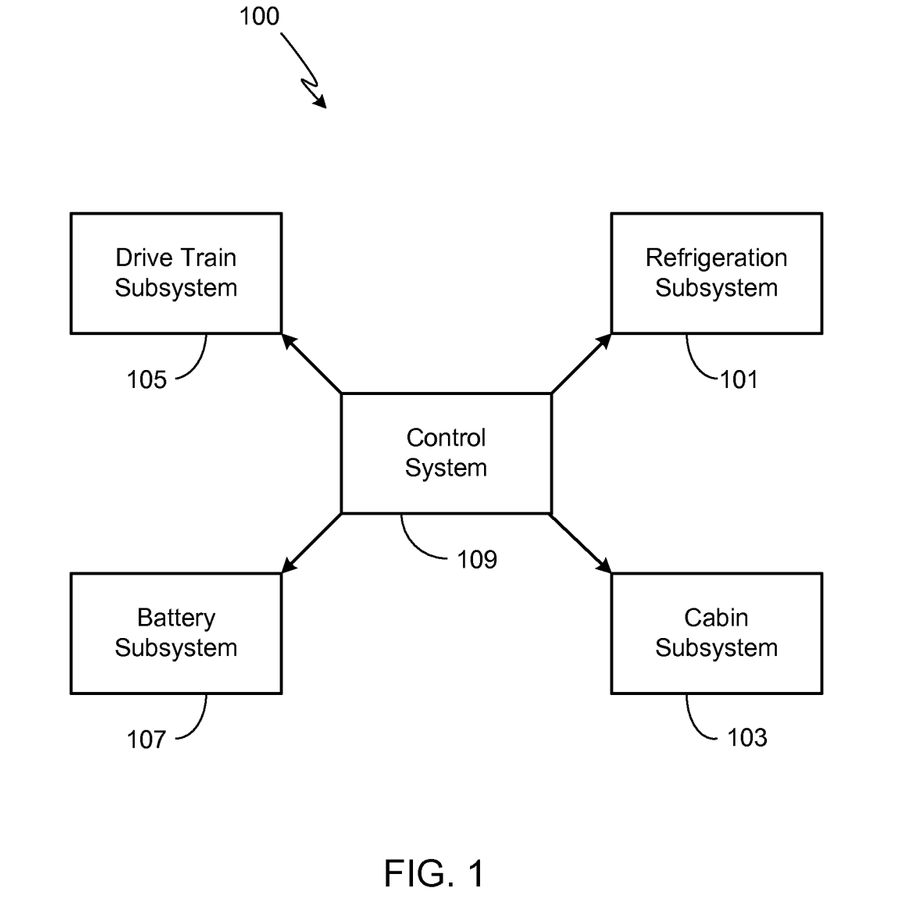
FIG. 1 provides a high level diagram of the various subsystems used in the thermal management system of an electric vehicle.

FIG. 1 is a high level diagram that illustrates the basic subsystems within the thermal management system 100 of a typical electric vehicle. In general, the thermal management system of such a vehicle includes a refrigeration subsystem 101, a passenger cabin subsystem 103, a drive train subsystem 105, and a battery subsystem 107. Thermal management system 100 also includes a control system 109. While it will be appreciated that the present invention does not require a specific system configuration, further details for each of the subsystems shown in FIG. 1 is provided below to illustrate one possible system for use with the present invention.

Refrigeration subsystem 101 is designed to be thermally coupled to one or more of the other thermal subsystems comprising system 100 whenever it is necessary, or desirable, to reduce the temperature in the thermally-coupled subsystem. Refrigeration subsystem 101 may utilize a refrigerant (e.g., R134a) compression system, a thermo-electric cooler, or other means. In a typical configuration, subsystem 101 includes a compressor that compresses the low temperature refrigerant vapor in the subsystem into a high temperature vapor. The refrigerant vapor then dissipates a portion of the captured heat when it passes through a condenser, thereby leading to a phase change from vapor to liquid, the liquid remaining at a high temperature and pressure. The performance of the condenser may be enhanced by using a blower fan. The liquid phase refrigerant then passes through a receiver-dryer which removes moisture from the condensed refrigerant. Typically the refrigerant line is coupled to a cabin evaporator within cab subsystem 103.

Heating, ventilation and cooling (HVAC) subsystem 103 provides temperature control for the vehicle's passenger cabin, typically via a plurality of ducts and vents. Preferably HVAC subsystem 103 includes one or more fans that are used to circulate air throughout the cabin on demand, regardless of whether the air is heated, cooled, or simply fresh air from outside the vehicle. To provide cool air, refrigerant from refrigeration system 101 is circulated through a cabin evaporator. To provide warm air during normal vehicle operation, HVAC subsystem 103 may utilize a heater, for example a PTC heater integrated within the cabin evaporator. HVAC subsystem 103 may also include means such as a heat exchanger for transferring thermal energy from either drive train subsystem 105 or battery subsystem 107 to the HVAC subsystem.

In an electric vehicle, system 100 may include a drive train subsystem 105 that is used to cool the drive motor or motors (i.e., the vehicle's traction motor). Typically subsystem 105 will include a power train cooling loop. Preferably the power train cooling loop is also thermally coupled to other vehicle electronic components, for example the power electronics module and inverter for the motor(s). If the system includes a battery charger for charging a rechargeable battery within battery subsystem 107 using an external power source, preferably the charger is also coupled to the power train cooling loop. Alternately, the charger may be coupled to the battery system cooling loop. Normally the power train cooling loop will include a coolant circulation pump, a radiator for discharging the heat to the ambient atmosphere, and a coolant reservoir. The system may also include a fan for forcing air through the radiator when insufficient air is passing through the radiator to achieve the desired level of cooling, for example when the vehicle is not moving.

Battery subsystem 107 includes a plurality of batteries, preferably assembled in a close-packed array, that are at least partially housed within one or more coolant jackets through which a liquid coolant (i.e., a heat transfer medium such as water) is pumped via one or more circulation pumps. As described in detail below, the coolant jacket maximizes the thermal contact area of each cell of the array and the coolant, while still electrically isolating the cells from each other as well as the coolant. The coolant jacket is coupled to a cooling system via a coolant loop. The cooling system used with battery subsystem 107 and the coolant jacket may be a dedicated cooling subsystem; alternately, the coolant within this cooling subsystem may be cooled via heat transfer with the refrigerant of refrigeration subsystem 101 using one or more heat exchangers; alternately, or in combination with refrigeration subsystem 101, the coolant within this cooling subsystem may pass through a radiator (i.e., a heat exchanger). Additionally, the coolant system used with battery subsystem 107 and the coolant jacket may be thermally coupled to a heater (e.g., a PTC heater), thus insuring that the temperature of batteries can be maintained within their preferred operating range regardless of the ambient temperature.

It will be appreciated that there are numerous techniques that may be used by control system 109 to control the operation of the individual thermal management subsystems in general, and more specifically, the amount of cooling supplied by refrigeration subsystem 101 to the other subsystems. Typically control system 109 uses a plurality of temperature detectors to monitor the temperature within the various vehicle components (e.g., batteries, motor, drive electronics, etc.), within one or more regions of the coolant loops and within one or more locations within the passenger cabin. The monitored temperatures at these various locations are used by control system 109 to determine the operation of the various thermal management subsystems. In response to the monitored temperatures and the desired temperature range for the cabin and the various vehicle components, the amount of heating and/or cooling applied by each subsystem is regulated, for example via flow valves within the coolant loops, pump rates of the various circulation pumps, heater operation, and blower fan operation. Control system 109 may operate automatically based on programming implemented by a processor, or system 109 may be manually controlled, or system 109 may use some combination of manual and automated control.

Figure 2:
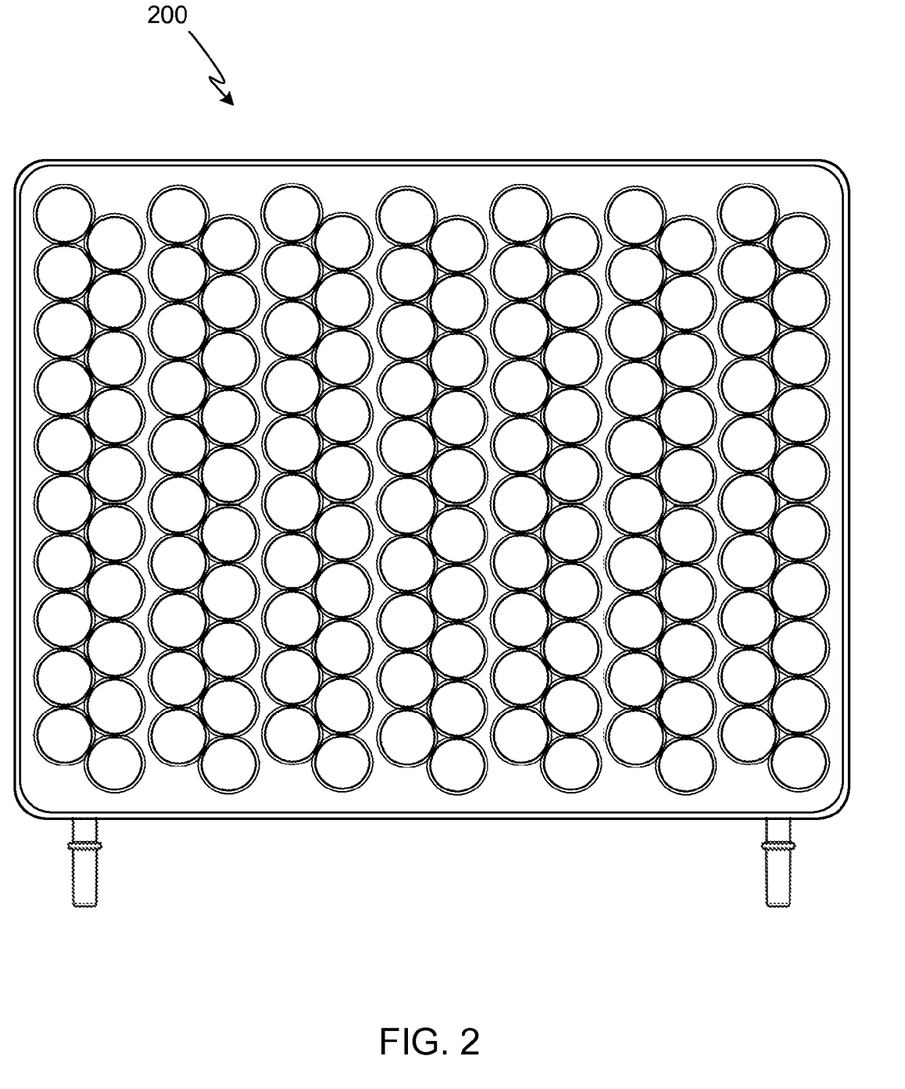
FIG. 2 provides a top view of a coolant jacket in accordance with the invention, this jacket designed to cool 140 cells.
Figure 3:
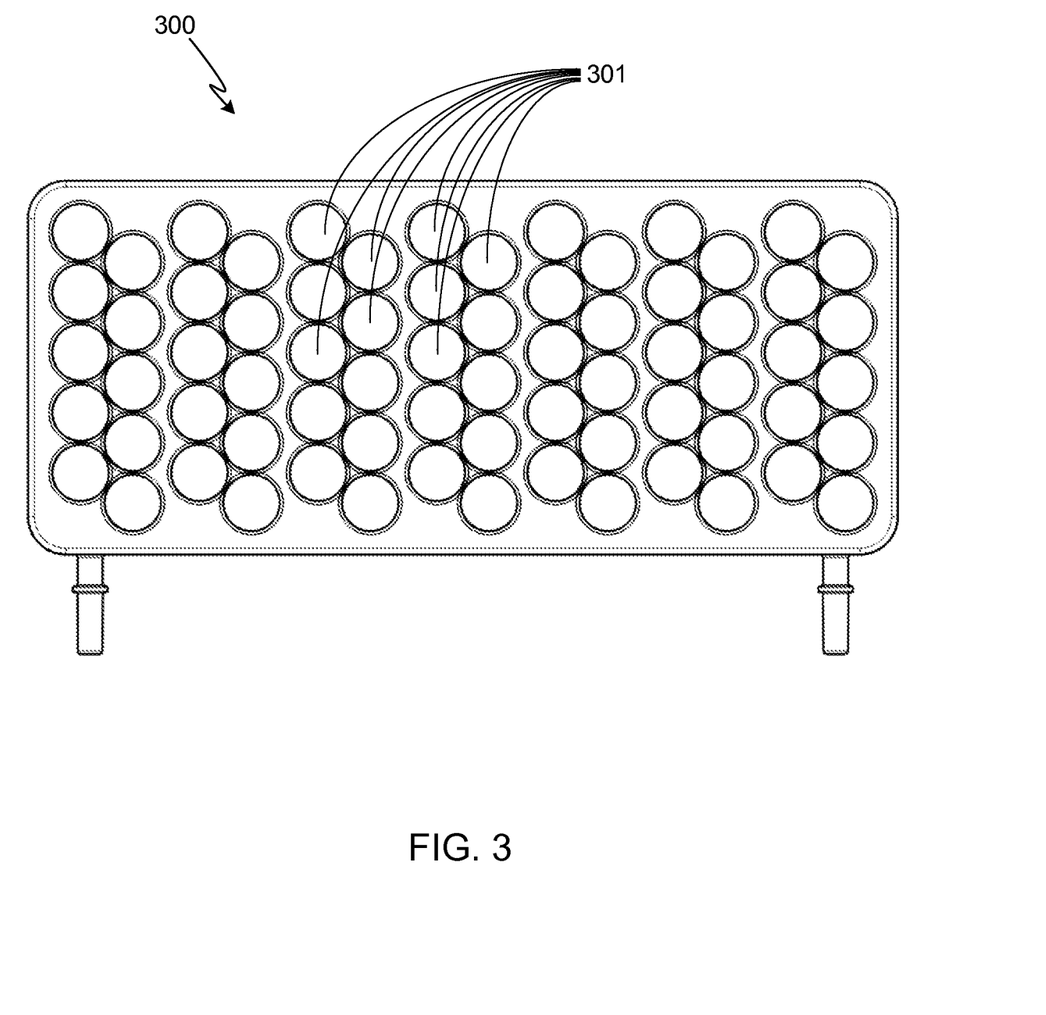
FIG. 3 provides a top view of an alternate coolant jacket designed to cool 70 cells.

FIGS. 2 and 3 provide top views of two representative coolant jackets 200 and 300, respectively. It should be understood that while the coolant jacket of the invention is described herein as an individual component, it is typically housed within, or integrated into, a battery pack enclosure. Furthermore, depending upon the number of cells within the battery pack, more than one coolant jacket may be required to cool all of the cells, the individual coolant jackets being coupled serially, in parallel, or using individual and independent cooling systems.

Jacket 200, shown in FIG. 2, is designed to cool 140 cylindrical cells while jacket 300, shown in FIG. 3, is designed to cool 70 cylindrical cells. It will be appreciated that the coolant jacket of the invention is not limited to a specific number of cells, or even a specific arrangement of cells. Typically the size of the coolant jacket, and thus the number of cells that the jacket is configured to cool, is limited by the manufacturability of the jacket since in general, the larger the jacket, the more difficult it is to achieve the desired hermetic seals described in detail below. Additionally, the number of cells that can be effectively cooled within a single jacket is limited by the volume and flow speed of the coolant through the jacket, the thermal contact area between the cells and the coolant, the temperature of the incoming coolant, the heat load due to the cells, and the desired temperature range of the cells. It should be understood that while the invention is illustrated for cylindrical cells, preferably cells utilizing an 18650 form factor, the coolant jacket of the invention may be designed to cool cells utilizing other shapes.

Figure 4:
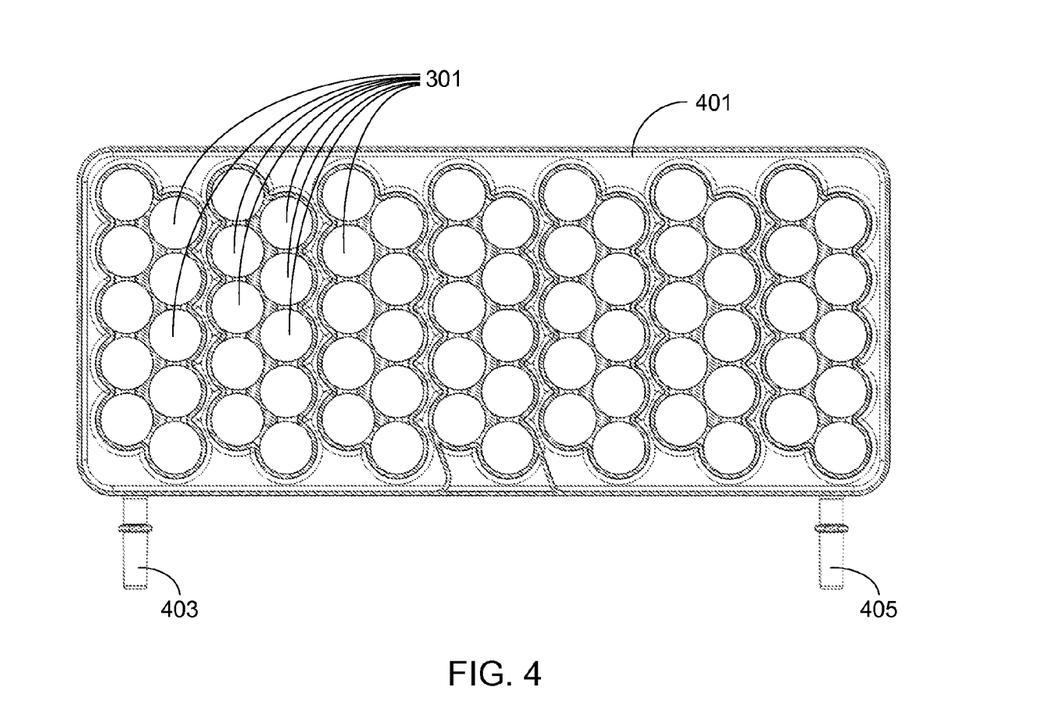
FIG. 4 provides an inside view of a lower jacket member that is based on the 70 cell coolant jacket shown in FIG. 3.
Figure 5:
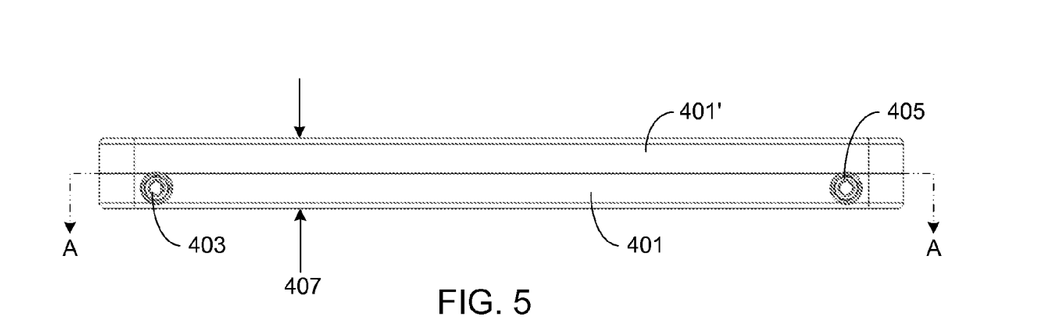
FIG. 5 provides a side view of the coolant jacket shown in FIG. 3.

In at least one preferred embodiment, the coolant jacket includes an upper and a lower jacket member each of which is preferably fabricated using a molding process, and preferably fabricated from a plastic, thermoplastic (such as ABS), nylon, polypropylene, polyethylene, or similar material. FIG. 4 provides an inside view of a lower jacket member 401 which is based on the 70 cell jacket shown in FIG. 3. As the upper and lower members are preferably minor images of one another, a separate illustration of the upper jacket member is not included herein. FIG. 5 provides a side view of coolant jacket 300, this view showing both lower jacket member 401 and upper jacket member 401'. Note that the only difference between the two jacket members in this embodiment is that lower jacket member 401 includes both a coolant inlet 403 and a coolant outlet 405. Preferably the overall thickness 407 of the coolant jacket is between 10 millimeters and 65 millimeters, and more preferably around 41 millimeters thick, although it will be appreciated that other sizes may be used depending upon the dimensions of the cells, the cell configuration, the desired mass of the coolant jacket (with coolant), cost, cooling system requirements, etc. It should be understood that while a pair of jacket members as described herein is preferred, a coolant jacket in accordance with the invention can also be fabricated from a single member or may utilize more than just a pair of housing members.

Each coolant jacket member 401/401' includes a plurality of apertures 301 equivalent in number to the number of cells that are to be cooled by the jacket. Preferably each cell is interference fit into a corresponding aperture 301, the interference fit providing not only a suitable means of positioning the cells within the jacket, but also an excellent method of achieving the desired transfer of thermal energy between the outer cell walls and the coolant flowing within the hollow regions of the jacket. Assuming an 18650 form-factor cell, preferably the diameter of each aperture 301 is 17.81±0.40 millimeters. In an alternate embodiment of the invention, a layer of mechanically compressible, thermally conductive material wraps around each cell, this layer of material insuring that the desired level of thermal conductivity is achieved even if the cells and the jacket apertures expand and contract at different rates during changes in temperature. In yet another alternate embodiment, the layer of thermally conductive material is injected between the inner walls of each aperture 301 and the corresponding cell.

In accordance with the invention, apertures 301, and therefore the cells that fit within the apertures, are grouped together in order to simplify coolant jacket fabrication while achieving the desired level of cell cooling. While cells may be grouped as single rows, preferably they are grouped together in double cell rows as shown in FIGS. 2-4. In the illustrated embodiment(s), each cell has a thermal contact area incorporating at least a third of its circumference. This aspect of the invention, along with exemplary coolant flow paths, is illustrated in FIGS. 6-9. FIGS. 6-9 provide cross-sectional views of the lower jacket member, taken along plane A-A shown in FIG. 5.

Figure 6:
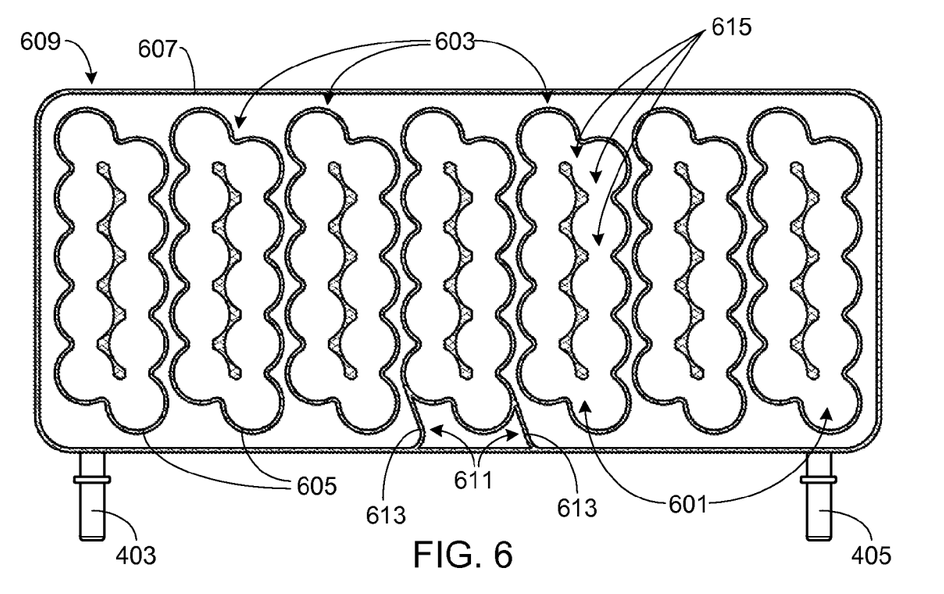
FIG. 6 provides a cross-sectional view of the lower jacket member shown in FIG. 4.

In the configurations shown in FIGS. 6-9, the cell apertures and therefore the cells are grouped together such that two rows of 5 apertures form a single unit 601. In FIG. 6, each of these aperture/cell groupings 601 is separated from the flow of coolant by coolant segregation walls 603. Each coolant segregation wall 603 is common to an entire cell group 601, thus forming a continuous barrier to ingress of the coolant into the cell group. Preferably walls 603 are 1.26±0.30 millimeters thick. Other wall thickness may be used to achieve the desired combination of thermal conductivity, strength and sealing capabilities. The edge 605 of each coolant segregation wall 603, as well as the edge 607 of the outer jacket wall 609, are hermetically sealed to the complementary edges of the opposing jacket member (e.g., member 401') to prevent coolant from either leaking from the coolant jacket, or leaking through a group coolant segregation wall 603 into a cell grouping 601. The complementary edges (e.g., edges 605 and 607) of the two jacket members (e.g., members 401 and 401') may be hermetically sealed together using any of a variety of means. Exemplary means include hot plate welding, ultrasonic welding, vibration welding, laser welding, microwave welding, and bonding using any of a variety of different adhesives/epoxies.

Figure 7:
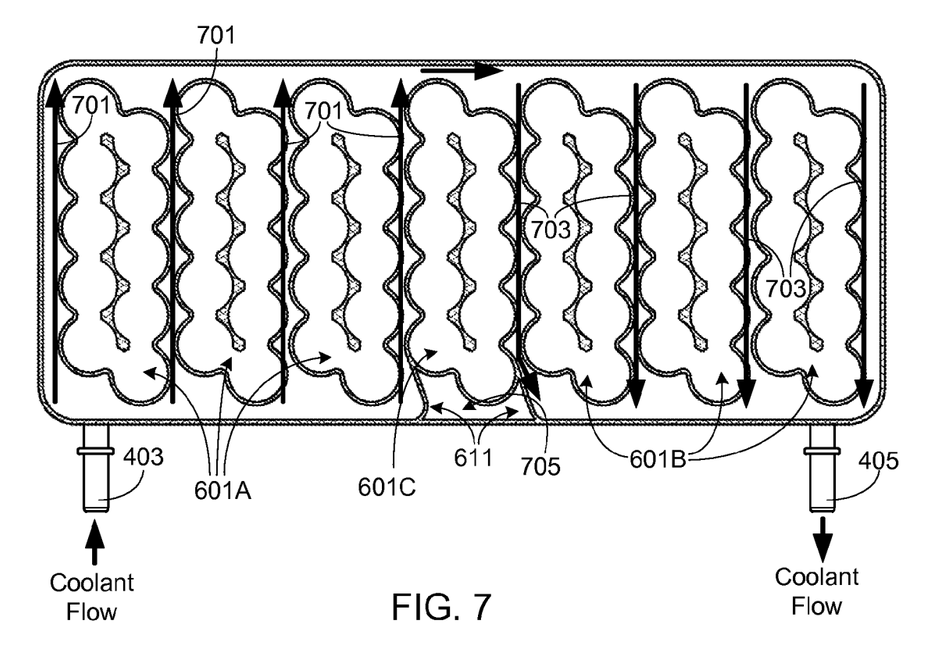
FIG. 7 illustrates the coolant flow pattern within the lower jacket member shown in FIG. 6.
Figure 8:
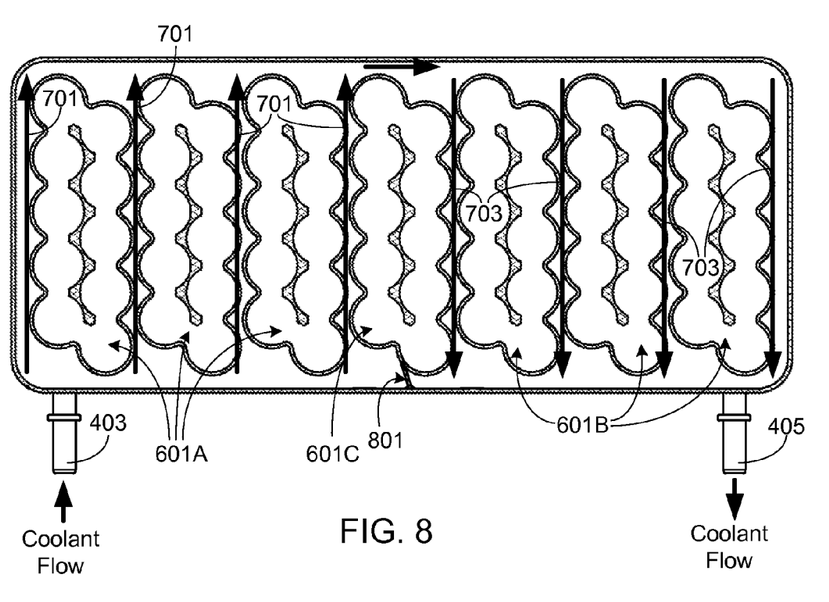
FIG. 8 illustrates a variation of the lower jacket member shown in FIG. 6 that achieves the same coolant flow pattern.

In addition to outer jacket walls 609 and cell group coolant segregation walls 603, preferably the two coolant jacket members include one or more walls that control the flow of coolant through the coolant jacket. Without flow control walls, and depending upon the configuration of the cell groups and coolant jacket, coolant may not adequately flow past all cell groups, causing localized regions of higher temperature. In the embodiment shown in FIGS. 6 and 7, a pair of flow control walls 611 is included, each wall 611 including an edge 613 that is hermetically sealed to the complementary edge of the complementary cooling flow control wall of the complementary jacket member. As illustrated in FIG. 7, walls 611 cause the flow of coolant entering inlet 403 to flow in direction 701 next to cell groups 601A (groups 601A being a sub-group of groups 601), and in the opposite direction 703 next to cell groups 601B (groups 601B being a sub-group of groups 601). Note that in this configuration, the left side of cell group 601C, also a sub-group, is adjacent to coolant flowing in direction 701 while the right side of this cell group is adjacent to coolant flowing in direction 703. In this configuration the use of two flow control walls 611 in combination with the location of these walls cause there to be no coolant flowing within region 705. One solution to this problem is to use a single flow control wall 801 as illustrated in FIG. 8.

Figure 9:
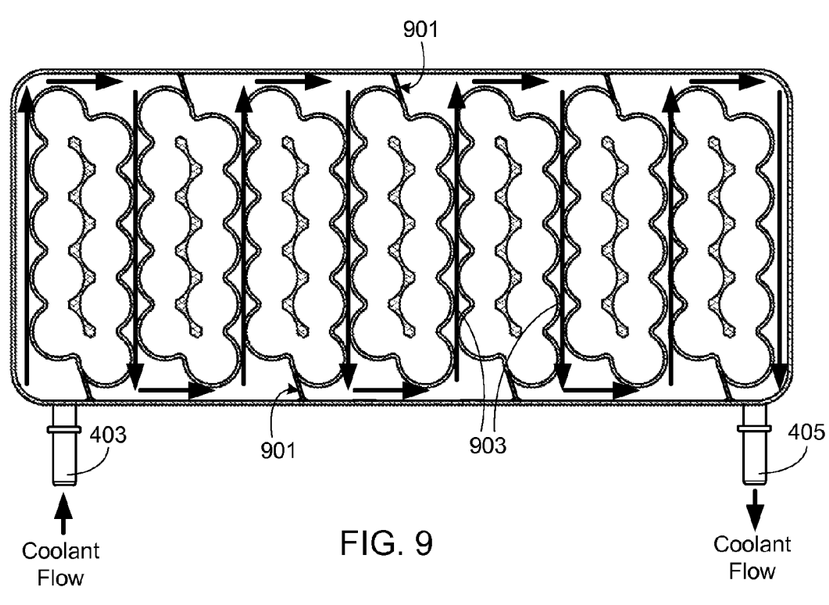
FIG. 9 illustrates another variation of the lower jacket member shown in FIG. 6 that achieves a different coolant flow pattern.

It should be understood that the present invention is not limited to a single coolant flow pattern or the use of a single configuration of flow control walls. For example, FIG. 9 illustrates an alternate configuration based on the coolant jacket shown in FIGS. 4-8. In the illustrated configuration, however, a plurality of flow control walls 901 are used to cause the coolant to flow back-and-forth between cell groups, following coolant flow path 903. Clearly the coolant jacket of the invention can use other flow control wall configurations to provide alternate flow pathways.

Figure 10:
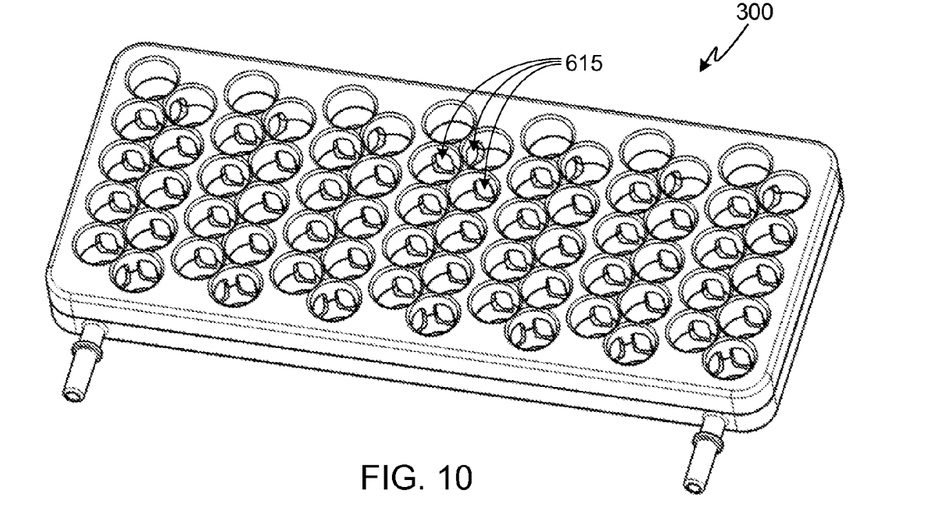
FIG. 10 provides a perspective view of the coolant jacket shown in FIG. 3.
Figure 11:
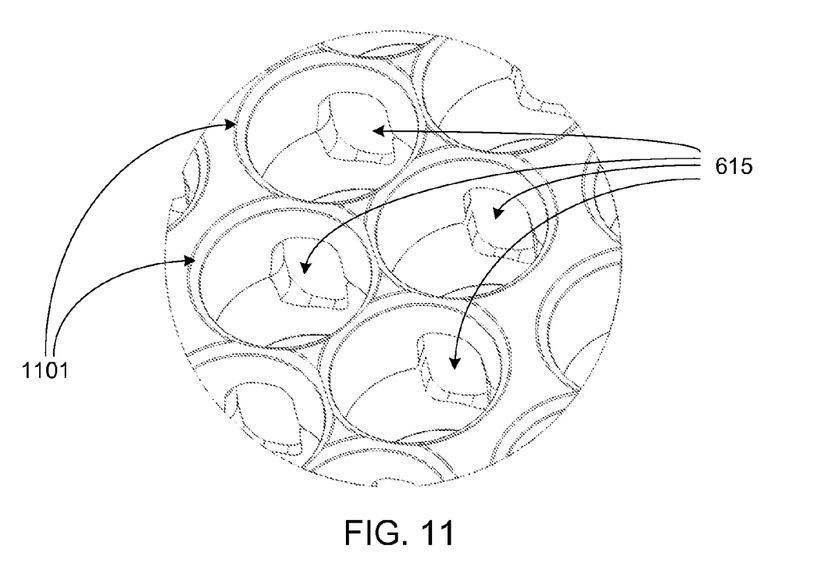
FIG. 11 provides further detail relating to a subset of the cell apertures shown in FIG. 10.
Figure 12:
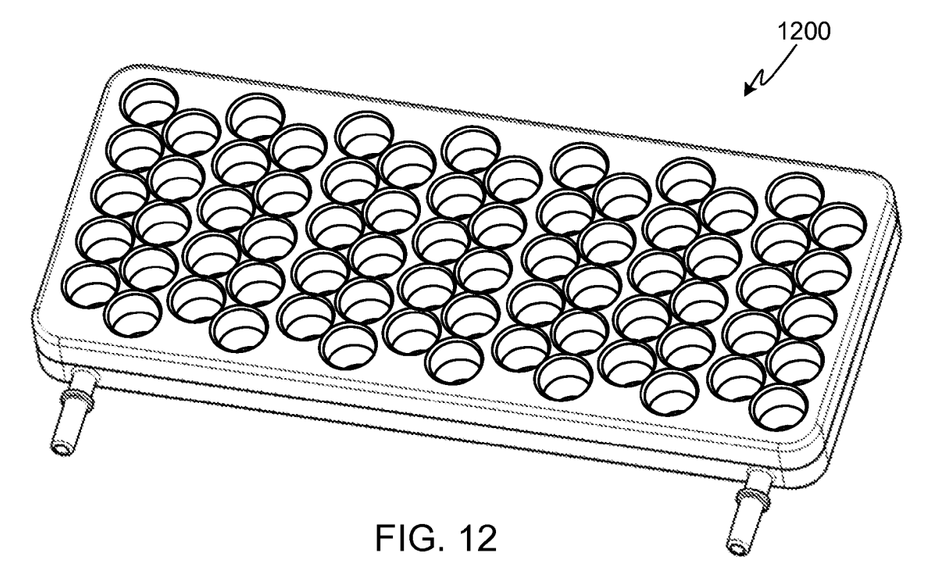
FIG. 12 provides a perspective view of an alternate coolant jacket that does not include apertures within the walls that separate the cells within each cell group.

As previously described and illustrated in FIG. 6, the cells within a cell group, e.g., group 601, are surrounded by a common wall, e.g., group coolant segregation wall 603. Within each cell group, the walls (also referred to herein as cell segregation walls) that separate the individual cells may or may not be continuous walls. For example, in the cross-sectional view shown in FIG. 6 the cell segregation walls separating adjacent cells are not continuous. In FIG. 6 this is shown by openings 615. A different view of openings 615 within the inner cell segregation walls of the cell groups is provided by FIGS. 10 and 11. FIG. 10 provides a perspective view of coolant jacket 300. FIG. 11 provides additional detail for a subset of cell apertures. Openings 615 may be varied from the illustrated size, or all together eliminated, in order to provide control over the transfer of thermal energy between adjacent cells. FIG. 12 provides a perspective view of an alternate coolant jacket 1200 that is the same as coolant jacket 300 except for the elimination of openings 615. Note that FIGS. 10-12 clearly show the chamfers 1101 that preferably surround each cell aperture 301, the chamfers simplifying the cell insertion procedure.

Figure 13:
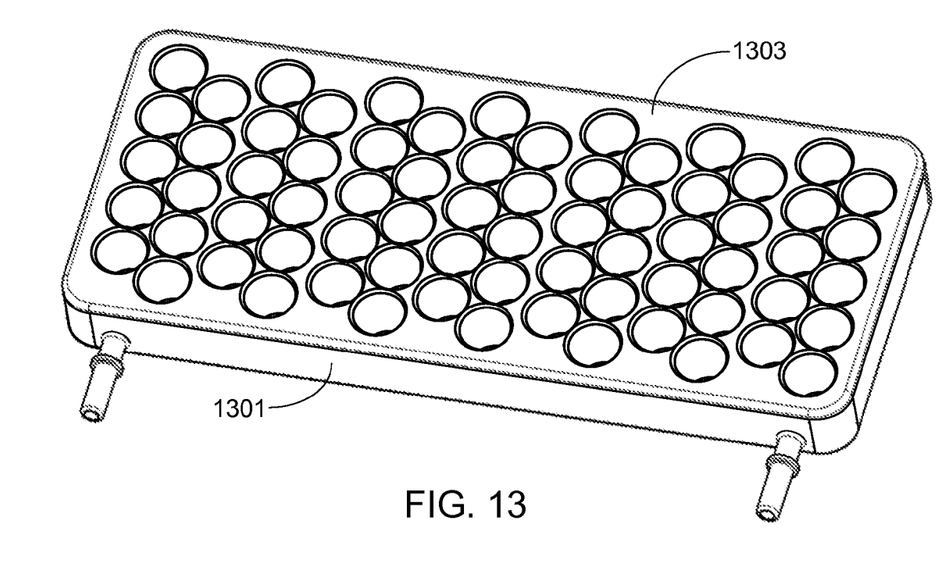
FIG. 13 provides a perspective view of an alternate coolant jacket.

Note that while the use of complimentary jacket members (e.g., members 401 and 401') is preferred, the invention can utilize other configurations that provide the same benefits through a different enclosure design. For example and as illustrated in FIG. 13, all of the internal features of the coolant jacket, e.g., the coolant segregation walls 603 and the flow control walls (e.g., walls 611, 801, 901) may be formed within one of the jacket members (e.g., member 1301) while the second jacket member (e.g., member 1303) is a flat (or nearly flat) 'lid' with a plurality of holes that align with the cell apertures 301. This approach may be used to simplify the formation of the hermetic seals described above. Although the jacket shown in FIG. 13 does not include any openings 615 between adjacent cells within a cell group, openings 615 may be included, if desired.

Figure 14:
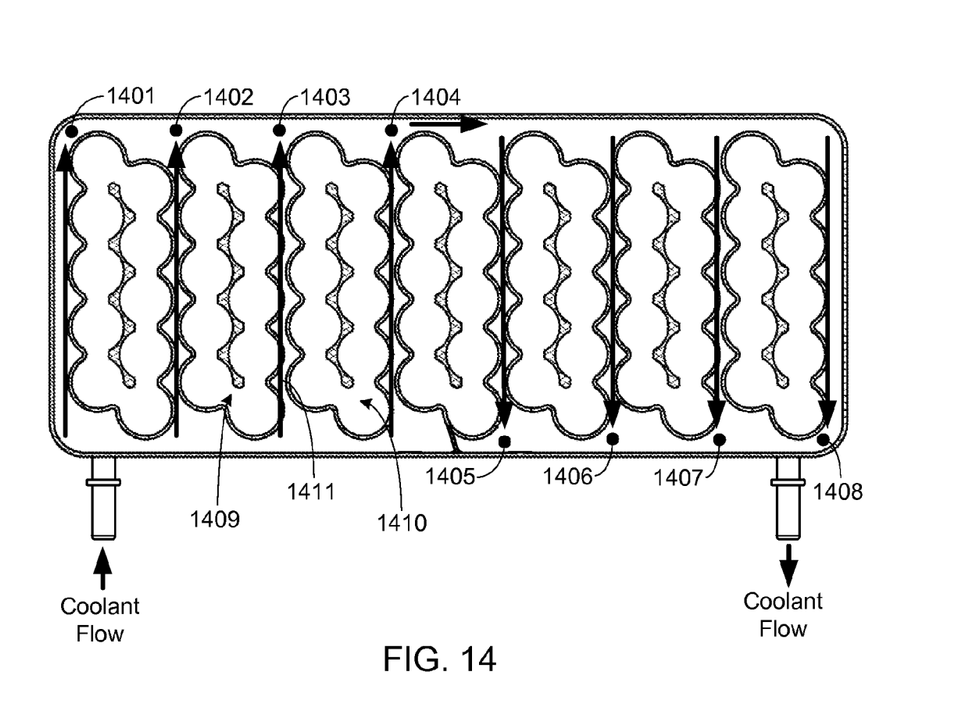
FIG. 14 illustrates a modification of the jacket shown in FIG. 8, the illustrated jacket including a plurality of temperature sensors.

While not required, in at least one preferred embodiment of the invention, one or more temperature sensors are included within the coolant jacket. FIG. 14 shows the same coolant jacket and view as provided in FIG. 8 with the inclusion of a plurality of temperature sensors 1401-1408. In this embodiment, each temperature sensor is positioned adjacent to, and near the end of, a cell group. The temperature sensors are also preferably located at the end of a coolant flow pathway, as shown. The temperature sensors provide valuable information as to the performance of the coolant jacket, as well as the health of the cells. For example, if temperature sensor 1403 detects a markedly different temperature than either sensor 1402 or sensor 1404, a blockage may have occurred between cell groups 1409 and 1410. If the temperature detected by sensor 1403 is much higher than the temperatures detected by adjacent sensors 1402 and 1404, then one of the cells in either cell group 1409 or 1410 that is adjacent to coolant flow pathway 1411 may be overheating (e.g., undergoing thermal runaway).

While the invention does not require the use of temperature sensors, or a specific number and/or location of sensors if they are used, preferably the coolant jacket includes at least one temperature sensor at the coolant inlet and a second temperature sensor at the coolant outlet. From the standpoint of obtaining detailed information about the performance of the cooling system as well as the health of the cells, clearly the more temperature sensors that may be included, the better the data obtained from the sensors. For example, by including temperature sensors at multiple locations between cell groups within each coolant flow pathway as well as at either end of each coolant flow pathway provides the most information about the cells and cooling system. It will be appreciated, however, that there is a tradeoff between data gathering through the inclusion of a large number of temperature sensors and the overall system complexity and cost. This tradeoff is further exacerbated as the number of cells and/or battery modules comprising the battery pack increases.

Figure 15:
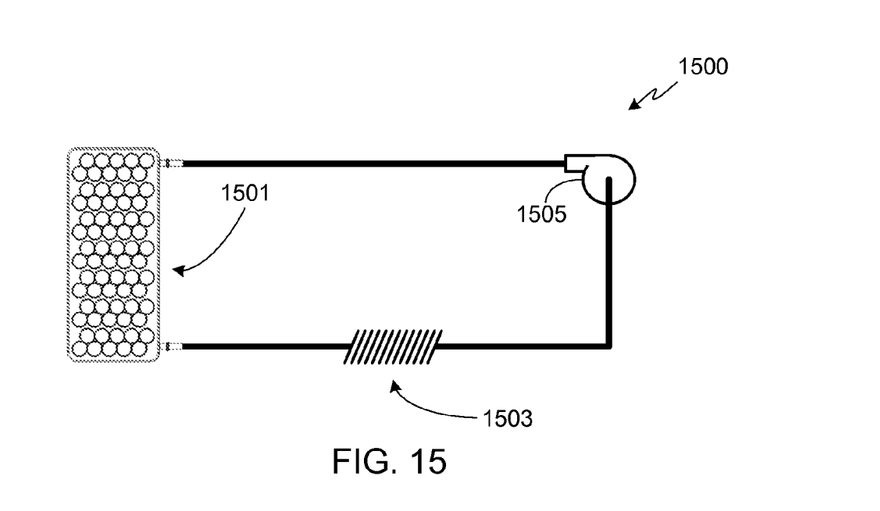
FIG. 15 illustrates a battery coolant jacket in accordance with the invention coupled to a cooling system.
Figure 16:
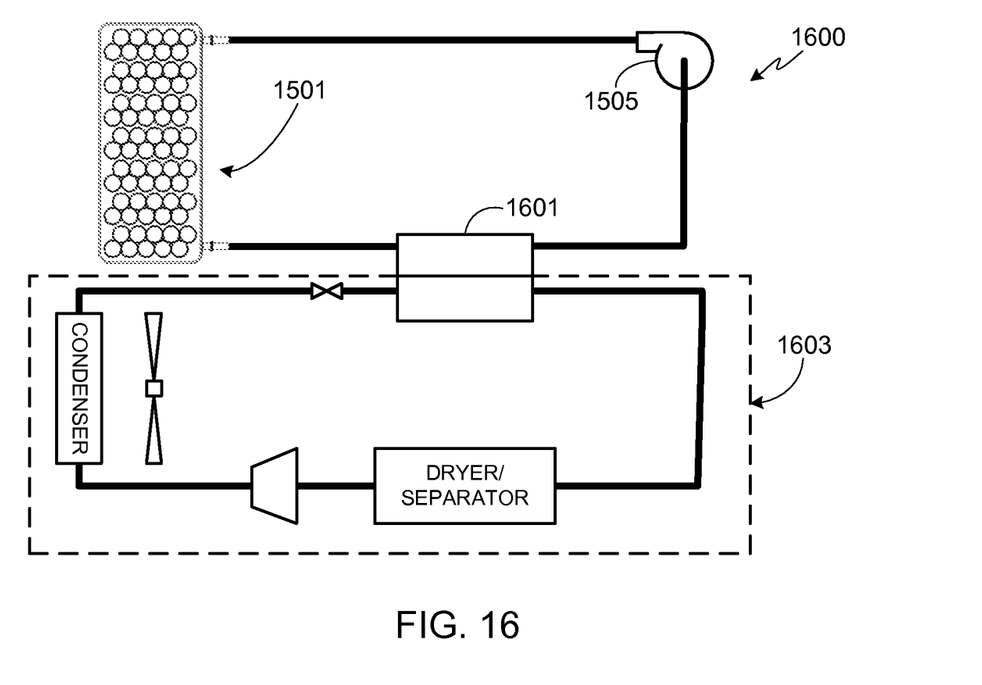
FIG. 16 illustrates a battery coolant jacket in accordance with the invention coupled to an alternate cooling system.

As previously noted, a cooling system utilizing the coolant jacket of the present invention may be coupled to any of a variety of different cooling systems. FIGS. 15 and 16 illustrate two such cooling systems. In the embodiment illustrated in FIG. 15, one or more coolant jackets 1501 are coupled to a radiator 1503. Cooling system 1500 may be completely passive or utilize a coolant pump 1505 as shown. In the embodiment illustrated in FIG. 16, one or more coolant jackets 1501 are coupled via a heat exchanger 1601 to a thermal management system 1603. Thermal management system 1603 may utilize a refrigeration system or other means as previously described.

Although the cells in the illustrated embodiments have a cylindrical form, e.g., an 18650 form-factor, as previously noted the invention may be used with other cell designs, shapes, configurations and form-factors. Additionally, the invention is not limited to a battery pack with a specific number of cells, a specific cell interconnect arrangement, or a specific battery pack configuration.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery coolant jacket for use with a plurality of cells, comprising:
    a hollow enclosure configured to permit a liquid coolant to flow through said hollow enclosure, wherein said liquid coolant enters said hollow enclosure via a coolant inlet and exits said hollow enclosure via a coolant outlet, wherein said hollow enclosure further comprises a first jacket member and a second jacket member;
    a plurality of cell apertures extending completely through said hollow enclosure from a first exterior enclosure surface corresponding to said first jacket member to a second exterior enclosure surface corresponding to said second jacket member, wherein each of said plurality of cell apertures is sized to fit one of said plurality of cells; and
    a plurality of coolant segregation walls integrated within said hollow enclosure, wherein said plurality of coolant segregation walls extend from a first interior enclosure surface corresponding to said first jacket member to a second interior enclosure surface corresponding to said second jacket member, wherein said plurality of coolant segregation walls divide said plurality of cells into a plurality of cell groups, wherein each cell group is comprised of multiple cells, wherein each of said plurality of coolant segregation walls segregates one of said plurality of cell groups from said plurality of cells, and wherein each of said plurality of coolant segregation walls forms a barrier between said cell group segregated by said coolant segregation wall and said liquid coolant flowing through said hollow enclosure.

2. The battery coolant jacket of claim 1, wherein said first jacket member is complementary to said second jacket member.

3. The battery coolant jacket of claim 1, wherein an inside diameter corresponding to each of said plurality of cell apertures is configured to allow an interference fit between each of said plurality of cell apertures and a corresponding cell of said plurality of cells.

4. The battery coolant jacket of claim 1, further comprising a layer of thermally conductive material interposed between each of said plurality of cell apertures and a corresponding cell of said plurality of cells.

5. The battery coolant jacket of claim 1, further comprising a layer of thermally conductive material injected between an interior wall of each of said plurality of cell apertures and an exterior surface of a corresponding cell of said plurality of cells.

6. The battery coolant jacket of claim 1, further comprising a layer of thermally conductive material wrapped around an exterior surface of each cell of said plurality of cells and interposed between said exterior surface and an interior surface of a corresponding cell aperture of said plurality of cell apertures.

7. The battery coolant jacket of claim 1, wherein each cell group of said plurality of cell groups is comprised of two adjacent rows of cells.

8. The battery coolant jacket of claim 1, wherein each cell of each cell group is completely segregated from other cells of said cell group by a cell segregation wall that extends continuously from a first interior enclosure surface through said hollow enclosure to a second interior enclosure surface.

9. The battery coolant jacket of claim 1, wherein each cell of each cell group is partially segregated from other cells of said cell group by a cell segregation wall that extends from a first interior enclosure surface through said hollow enclosure to a second interior enclosure surface.

10. The battery coolant jacket of claim 1, further comprising at least one flow control wall integrated within said hollow enclosure, wherein said at least one flow control wall controls a coolant flow pathway within said hollow enclosure and between said coolant inlet and said coolant outlet.

11. The battery coolant jacket of claim 10, wherein said at least one flow control wall is comprised of multiple integrated walls that cause said coolant flow pathway to alternate directions between adjacent cell groups.

12. The battery coolant jacket of claim 1, wherein said hollow enclosure is fabricated from a material selected from the group of materials consisting of plastic, thermoplastic, nylon, polypropylene, and polyethylene.

13. The battery coolant jacket of claim 1, further comprising at least one temperature sensor located within said hollow enclosure.

14. The battery coolant jacket of claim 13, said at least one temperature sensor comprising a first temperature sensor located within said hollow enclosure and adjacent to said coolant inlet, and a second temperature sensor located within said hollow enclosure and adjacent to said coolant outlet.

15. The battery coolant jacket of claim 13, said at least one temperature sensor comprising a plurality of temperature sensors located throughout said hollow enclosure and within a plurality of coolant flow pathways.

16. The battery coolant jacket of claim 1, wherein said battery coolant jacket is coupled to a vehicle battery cooling system via said coolant inlet and said coolant outlet.

17. The battery coolant jacket of claim 1, wherein said battery coolant jacket is mounted within a battery pack.

18. The battery coolant jacket of claim 1, wherein each of said plurality of cells utilizes an 18650 form-factor.

* * * * *